May 8, 1945.  R. B. MAGEE  2,375,233
TRACTOR MOUNTED WINCH
Filed April 30, 1942  3 Sheets-Sheet 1
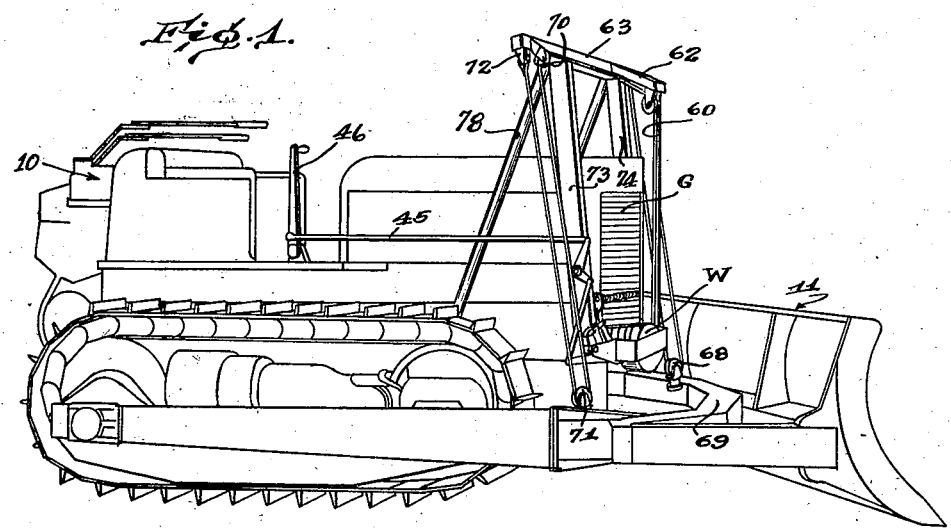
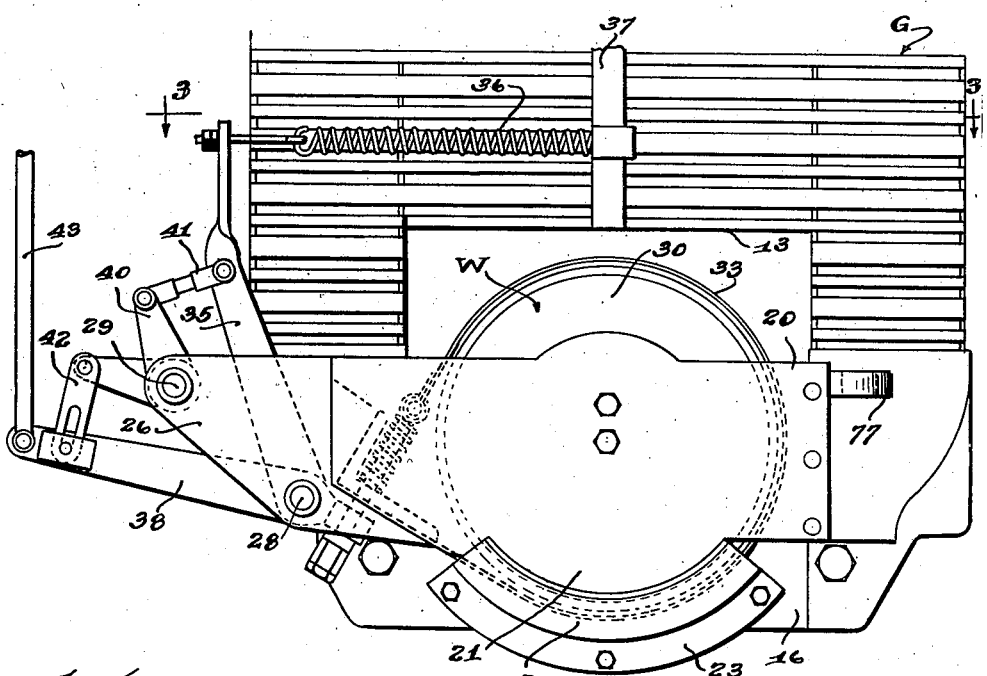
Robert B. Magee
INVENTOR
BY Malcolm W. Fraser
ATTORNEY May 8, 1945.  R. B. MAGEE  2,375,233
TRACTOR MOUNTED WINCH
Filed April 30, 1942  3 Sheets-Sheet 2
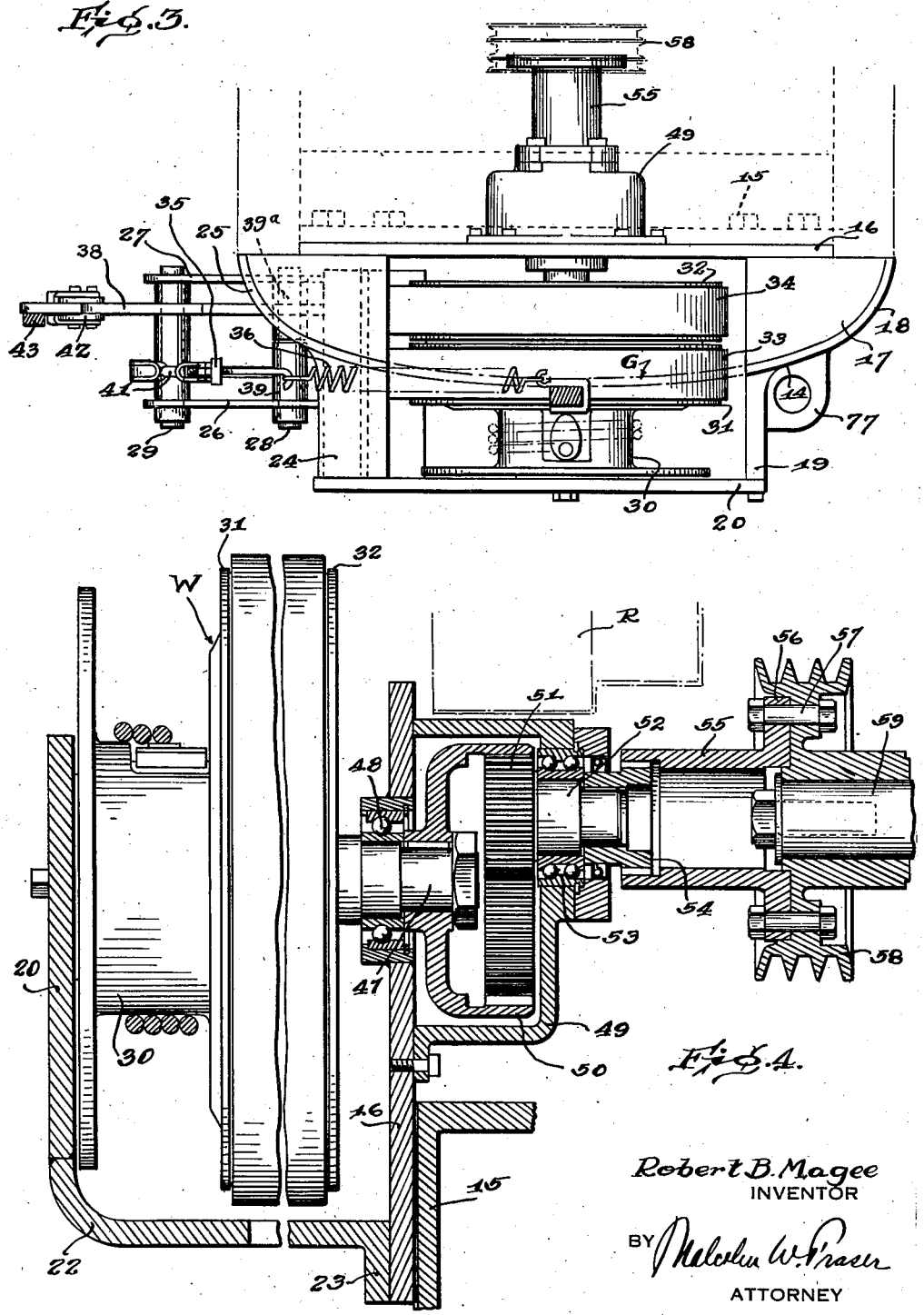
Robert B. Magee
INVENTOR
BY Malcolm W. Fraser
ATTORNEY May 6, 1945.  R. B. MAGEE  2,375,233
TRACTOR MOUNTED WINCH
Filed April 30, 1942  3 Sheets-Sheet 3

Robert B. Magee
INVENTOR

BY Malcolm W. Fraser
ATTORNEY

Patented May 8, 1945

2,375,233

UNITED STATES PATENT OFFICE 2,375,233

TRACTOR MOUNTED WINCH

Robert B. Magee, Findlay, Ohio, assignor, by mesne assignments, to R. G. Le Tourneau, Inc., Stockton, Calif., a corporation of California Application April 30, 1942, Serial No. 441,125

12 Claims. (Cl. 37—144)

This invention relates to power control units or winches particularly adapted for mounting on earth working tractors for actuating the scraper blades of bulldozers and trailbuilders.

An object is to produce a tractor structure in which a winch is mounted in an apertured portion of the front end of a tractor so as to be protected by the tractor and so that the space occupied by the winch is reduced to a minimum, thereby enabling the scraper blade or the like to be arranged in close relation to the tractor.

Another object is to produce a new and improved tractor winch combination in which the winch is of the planetary gear type and in which the clutch and brake bands are in the main concealed and protected by the radiator grille of the tractor with which the winch is intimately associated.

A further object is to provide a power control unit of the above character with a new and improved drive which enables the unit to be operatively connected to a power shaft of the tractor engine easily and without substantial change in the structure of the tractor thereby facilitating assembly operations and reducing the cost.

Other objects and advantages will hereinafter appear and for purposes of illustration but not of limitation, an embodiment of the invention is shown on the accompanying drawings in which Figure 1 is a side perspective view of a tractor equipped with a trailbuilder, a winch being mounted at the front end of the tractor in rear of the scraper blade;

Figure 2 is an enlarged front end elevation of the lower portion of the radiator grille with the front end winch mounted in juxtaposed position thereto;

Figure 3 is a view substantially on the line 3—3 of Figure 2, showing the mounting of the winch with relation to the radiator grille;

Figure 4 is a side elevation partly in section of the winch mounted on the tractor frame.

Figure 5:
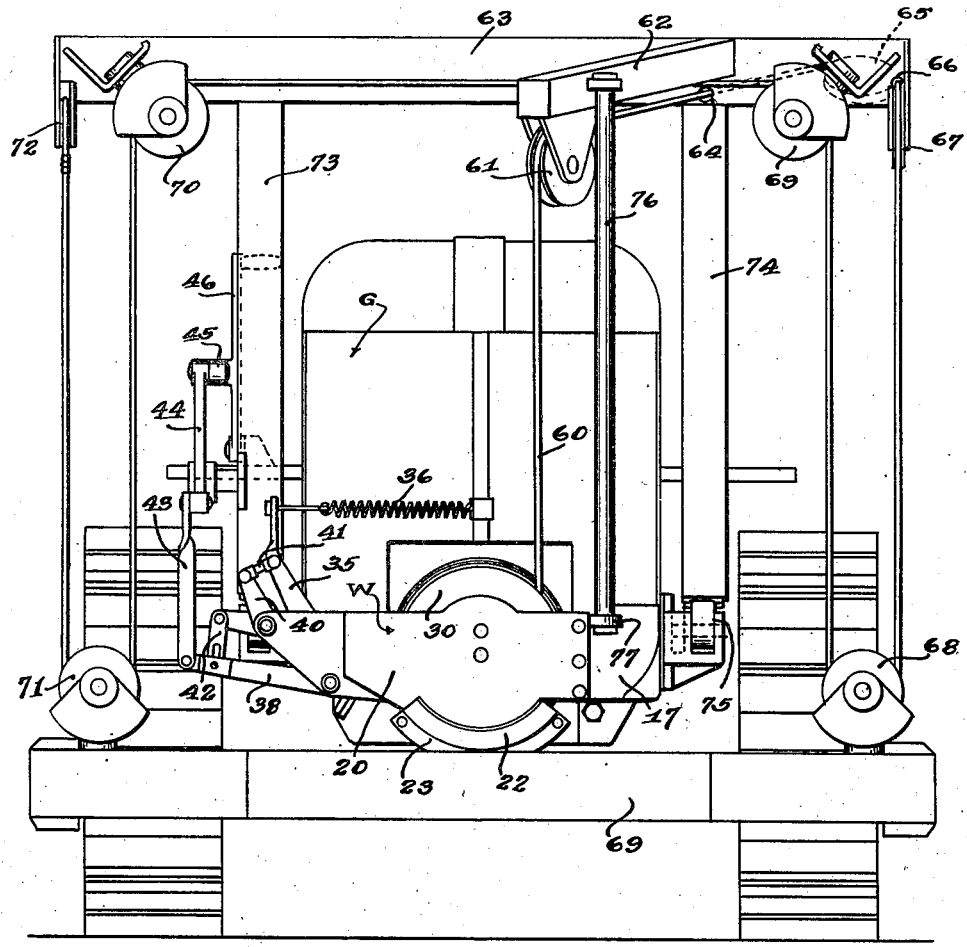
Figure 5 is a front end elevation of the tractor with the scraper blade removed and showing the front end winch, support and cable arrangement.

The illustrated embodiment of the invention comprises a crawler type tractor 10 which in this instance, is equipped with a trailbuilder 11 having the usual mold board or scraper blade. In the main, the structure of the tractor 10 and trailbuilder 11 form no part of the present invention. However, the radiator grille G disposed at the front end of the tractor and forming a guard for the usual radiator is formed at its lower end with a cut out or aperture 13 which is centrally disposed and is of sufficient size comfortably to receive the power control unit or winch as will hereinafter appear.

15 designates a cross member of the tractor frame at the front end thereof and suitably secured to the front of the frame piece 15 is an upright plate 16 which as indicated on Figure 4, is disposed slightly in front of and in the main below the engine radiator R. As indicated above, the grille G for the radiator R is disposed in advance thereof and bows outwardly therefrom. Fixed to one side of the plate 16 and secured to the front face thereof is a bracket piece 17 which has a curved front face 18 which conforms in general to the conformation of the grille G beneath which it is disposed. The bracket 17 has a forwardly extending portion 19 and secured to the front outer end of the portion 19 is a plate 20 which provides a front face or wall of the winch housing. The lower portion of the plate 20 has a downward curved projection 21 to which is welded a bottom wall piece 22 which curves downwardly and then extends rearwardly to the upright mounting plate 16. A downturned flange 23 on the bottom plate 22 abuts the plate 16 and is suitably bolted thereto.

Preferably secured as by welding to the rear face of the opposite end of the front plate 20 is a casting 24 which has an inner curved portion 25 which also conforms to the shape of the radiator grille G and is disposed directly below the lower end portion thereof. Rigid with the casting 24 and extending laterally therefrom in spaced relation are plates 26 and 27. Pivot pins 28 and 29 are suitably connected at their opposite ends to the plates 26 and 27.

The power control unit or winch generally indicated at W is of the planetary gear type and is equipped with a cable drum 30, clutch drum 32 and brake drum 31. Engaging the clutch drum 32 is a clutch band 34 and embracing the brake drum 31 is a band 33. The detail construction of the winch forms no part of the present invention and a general description thereof is therefore considered sufficient. For more detail understanding of the construction and operation of the power control unit, reference is hereby made to my copending application Serial No. 420,174, filed November 24, 1941, and entitled "Power control unit," and which has since issued as Patent 2,343,465. It will be manifest from an inspection of the drawings, that the brake and clutch bands are in the main covered and protected by the radiator grille G, every effort being made to dispose as much as possible of the mechanism rearwardly of the radiator grille so as to protect those parts and to bring only the cable drum in advance of the radiator grille. This arrangement has the very important additional advantage of reducing the amount of space required for the power control unit in front of the tractor so that the scraper blade or mold board of the trailbuilder or bulldozer may be positioned as closely as possible to the front end of the tractor, thereby to obtain maximum efficiency in operation.

The operating mechanism for the winch W comprises a lever 35 having a sleeve 39 pivoted on the pivot pin 29 and being suitably connected at its lower end to the brake band 33, a coil spring 36 connecting the free end of the arm 35 with the center post 37 of the radiator grille G, thus normally holding the band 33, in applied position. For applying the clutch band 34, an arm 38 has a sleeve 39a (Figure 3) engaging the pivot pin 29 and the inner end of the arm 38 operatively engages the clutch band 34. Mounted for rocking movement on the pivot pin 29 is a bell crank 40 which has a link connection 41 with the brake arm 35 and has a lost motion connection 42 with the clutch actuating arm 38. Connected to the outer end of the arm 38 is a link 43 which is connected to one arm of the bell crank 44, a rod 45 connecting to the other arm of the bell crank 44 and leading to an operating lever 46. When the operating lever 46 is in neutral position, it will be manifest that the spring 36 applies the brake band 33 to the brake drum 31 and due to the link and lever arrangement above described, when the operating lever 46 is moved in a counterclockwise direction (Figure 1), the clutch band 34 is applied to the clutch drum 32.

One important feature of the invention resides in the ease by which the power control unit W is operatively connected to the power shaft of the tractor. As shown, the driving shaft 47 for the winch W is mounted in an anti-friction bearing 48 carried by the upright mounting plate 16. On the rear side of the plate 16 is a gear casing 49 which is suitably bolted in place. Within the gear casing and fixed to the shaft 47 is a ring gear 50 with which a pinion 51 meshes. The pinion 51 is carried by a stub shaft 52, which is journalled in anti-friction bearings 53. Fixed to the stub shaft 52 is a coupling part 54 which is suitably connected to an elongate coupling part 55. The coupling part 55 has a flange 56 which is secured by bolts 57 to the fan pulley 58, the latter being fixed to the engine crank shaft 59. The particular form of coupling connection can be varied as well be readily understood and if desired, a flexible coupling could be employed to advantage. It will be evident that the simplicity and ease by which the winch is operatively connected to the power shaft, in this instance the engine crank shaft 59, enables the connection to be established within a minimum period of time. It is further manifest that the operative driving connection is such that the number of parts is reduced to a minimum, thereby reducing the cost of the installation as well as the upkeep and repair.

One end portion of a cable 60 is wrapped about the cable drum 30. From the drum 30 the cable extends upwardly over a sheave 61 which is carried by a forwardly extending arm 62 the rear end of which is fixed to a cross beam 63 which extends transversely of and above the tractor. From the sheave 61 the cable passes through an aperture 64 in the cross beam 63 and passes about a sheave 65 which is carried by the cross beam 63 on the rearward side thereof. The cable then extends forwardly through an opening 66 in the beam 63 and then passes downwardly over a sheave 67 carried by the beam 63. From the sheave 67 the cable extends downwardly and about a sheave 68 which is carried by the U frame 69 of the trailbuilder and to which the usual mold board or scraper blade is attached. From the sheave 68 the cable extends upwardly to a sheave 69 which is carried by the beam 63 and from the sheave 69 the cable extends horizontally to the other side of the beam 63 and about a sheave 70. From the sheave 70 the cable extends downwardly about a sheave 71 carried by an opposite side portion of the U frame 69. From the sheave 71, the cable extends upwardly and is dead ended at 72 on the adjacent end of the cross beam 63. In this manner it will be manifest that the U frame 69 of the trailbuilder (or bulldozer as the case may be), may be raised or lowered as desired by driving the cable drum 30 to wind up the cable or by releasing the cable drum 30 to allow the cable to unwind for lowering the mold board to the desired position.

The cross beam 63 is carried by a pair of uprights 73 and 74 each of which is pivotally connected at its lower end as indicated at 75 on a bracket extending laterally of the tractor frame. The forwardly extending arm 62 is braced by a post 76 the lower end of which rests upon a pad 77 which is integral with the bracket member 17, above described. The integral frame formed by the cross beam 63 and uprights 73 and 74 is braced by rearwardly inclined posts 78, one being disposed on each side and the lower ends being suitably fixed to brackets (not shown) on the tractor frame. The pivotal mounting of the uprights 73 and 74 enables the super structure to be properly positioned and enables the structure to be adapted to tractors of this design.

From the above description, it will be evident that I have produced a front end winch which is compactly arranged with respect to the tractor body, the major portion of the mechanism being concealed and guarded by the radiator grille of the tractor and the principal exposed portion being the cable drum. It will be observed that the winch occupies very little space in front of the tractor, thereby enabling the C frame 69 to be brought back close to the front of the tractor which is a very desirable arrangement.

It is to be understood that numerous changes in details of construction, arrangement and operation may be effected without departing from the spirit of the invention especially as defined in the appended claims.

What I claim is:

1. In a bulldozer having a tractor, a bulldozer blade arranged in close juxtaposition to the front end of said tractor, a winch for controlling the vertical position of said bulldozer blade, said tractor having an apertured front end portion for receiving a substantial portion of said winch, said winch having a cable drum arranged in exposed position in front of the tractor and the remaining parts thereof substantially concealed by the tractor, means for mounting said winch within said apertured portion, and an operative connection between said winch and bulldozer blade.

2. In a bulldozer having a tractor, a bulldozer blade arranged in close juxtaposition to the front end of said tractor, a winch for controlling the vertical position of said bulldozer blade, an operative connection between said tractor and winch, said tractor having a grille at the front end and said grille being apertured to receive the winch, means for mounting the winch within the grille aperture so that a substantial portion thereof is protected by the grille, and an operative connection between said winch and bulldozer blade.

3. In a bulldozer having a tractor, a bulldozer blade arranged in close juxtaposition to the front end of said tractor, a winch for controlling the vertical position of said bulldozer blade, an operative connection between said tractor and winch, said tractor having a grille at the front end and said grille being apertured to receive the winch, means for mounting the winch within the grille aperture so that a substantial portion thereof is protected by the grille, said mounting means including a bracket frame disposed at the lower end of said grille and having a support for the winch drum extending forwardly of the grille, and an operative connection between said winch and bulldozer blade.

4. In a bulldozer having a tractor, a bulldozer blade arranged in close juxtaposition to the front end of said tractor, a winch for controlling the vertical position of said bulldozer blade, an operative driving connection between said tractor and winch, a grille at the front end of the tractor, the lower portion of said grille being cut away sufficiently to accommodate said winch, a bracket frame directly below said cut away portion for supporting the winch in such manner that a substantial portion thereof is arranged inwardly of the grille, and an operative connection between said winch and bulldozer blade.

5. In a bulldozer having a tractor, a bulldozer blade arranged in close juxtaposition to the front end of said tractor, a winch for controlling the vertical position of said bulldozer blade, an operative driving connection between said tractor and winch, a grille at the front end of the tractor, the lower portion of said grille being cut away sufficiently to accommodate said winch, a bracket frame directly below said cut away portion for supporting the winch in such manner that a substantial portion thereof is arranged inwardly of the grille, a sheave carrying superstructure on said tractor, and cable leading from said winch over the sheaves on the superstructure to said bulldozer blade.

6. In a bulldozer having a tractor, a bulldozer blade arranged in close juxtaposition to the front end of said tractor, a winch for controlling the vertical position of said bulldozer blade, an operative driving connection between said tractor and winch, a grille at the front end of the tractor, the lower portion of said grille being cut away sufficiently to accommodate said winch, a bracket frame directly below said cut away portion for supporting the winch in such manner that a substantial portion thereof is arranged inwardly of the grille, the winch cable drum projecting forwardly of the grille, a sheave carrying superstructure on said tractor and including a forwardly extending sheave carrying arm, a brace on said bracket frame for said arm, the sheave on said arm being arranged approximately over said drum, and a cable from said drum reeved through said sheaves for actuating said bulldozer blade.

7. The combination of a tractor having a crank shaft and a radiator grille, a planetary type winch having a cable drum and clutch and brake bands in the rear of said cable drum, an operative connection between said winch and crank shaft, said grille being apertured, and means for mounting said winch within said grille aperture with said cable drum disposed forwardly of the grille and with said clutch and brake bands substantially protected by the grille.

8. The combination of a tractor having a crank shaft and a radiator grille, a planetary type winch having a cable drum and clutch and brake bands in the rear of said cable drum, an operative connection between said winch and crank shaft, said grille being apertured, and means for mounting said winch within said grille aperture with said cable drum disposed forwardly of the grille and with said clutch and brake bands substantially protected by the grille, said mounting means having portions constituting continuations of the grille, said continuations provided with forwardly extending supporting brackets, and winch supporting means joining said brackets.

9. The combination of a tractor having a crank shaft and a radiator grille, a planetary type winch having a cable drum and clutch and brake bands in the rear of said cable drum, an operative connection between said winch and crank shaft, said operative connection including a sleeve detachably connected to said crank shaft, a driving pinion, an operative connection between said pinion and sleeve, a drum driving shaft, and a ring gear on said drum driving shaft and operatively engaged by said pinion, said grille being apertured, and means for mounting said winch within said grille aperture with said cable drum disposed forwardly of the grille and with said clutch and brake bands substantially protected by the grille.

10. In a machine of the class described, a tractor, an implement mounted in front of the tractor for reciprocatory movements, a winch operatively connected to said implement, said tractor having an apertured front end portion for receiving a substantial portion of said winch, said winch having a cable drum arranged substantially in advance of said apertured portion and the remaining parts substantially concealed by the tractor, and a mounting for said winch including a plate extending across and in front of a portion of said drum.

11. In a machine of the class described, a tractor, an implement mounted in front of the tractor for reciprocatory movements, a winch operatively connected to said implement, said tractor having an apertured front end portion for receiving a substantial portion of said winch, said winch having a cable drum arranged substantially in advance of said apertured portion and the remaining parts substantially concealed by the tractor, and a mounting for said winch including plate means arranged close to and extending across the front end of said drum and also underneath said drum.

12. In a machine of the class described, a tractor, an implement mounted in front of the tractor for reciprocatory movements, a winch operatively connected to said implement, said tractor having an apertured front end portion for receiving a substantial portion of said winch, said winch having a cable drum arranged substantially in advance of said apertured portion and the remaining parts substantially concealed by the tractor, and a mounting for said winch including protective means projecting forwardly of said apertured portion and covering a portion of the front face of, and the under part of, said drum.

ROBERT B. MAGEE.